(12) United States Patent
Lim

(10) Patent No.: US 7,583,800 B2
(45) Date of Patent: Sep. 1, 2009

(54) ENCRYPTION APPARATUS AND METHOD IN A WIRELESS COMMUNICATIONS SYSTEM

(75) Inventor: Jong-Su Lim, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 10/679,391

(22) Filed: Oct. 7, 2003

(65) Prior Publication Data

US 2004/0071290 A1     Apr. 15, 2004

(30) Foreign Application Priority Data

Oct. 8, 2002     (KR) ...................... 10-2002-0061179

(51) Int. Cl.
  *H04K 1/04*   (2006.01)
  *H04K 1/00*   (2006.01)
  *H04L 9/00*   (2006.01)

(52) U.S. Cl. ............................ 380/37; 380/42; 380/270

(58) Field of Classification Search .................. 380/28, 380/37, 42, 270
  See application file for complete search history.

(56) References Cited

U.S. PATENT DOCUMENTS

| 4,304,961 | A | * | 12/1981 | Campbell, Jr. .............. 713/170 |
| 4,731,843 | A | * | 3/1988 | Holmquist .................... 380/29 |
| 5,329,623 | A | * | 7/1994 | Smith et al. ................. 713/153 |
| 6,324,288 | B1 | * | 11/2001 | Hoffman ..................... 380/249 |
| 2002/0131589 | A1 | * | 9/2002 | Matsui et al. ................. 380/37 |
| 2003/0152219 | A1 | * | 8/2003 | Coppersmith et al. ......... 380/37 |

OTHER PUBLICATIONS

3rd Generation Partnership Project, Document 2: Kasumi Specification, Aug. 28, 2001, Release 4.*
Hoonjae Lee, "Parallel stream cipher for secure high-speed communications", Jul. 9, 2001, p. 259-265.*

* cited by examiner

*Primary Examiner*—Kimyen Vu
*Assistant Examiner*—Suman Debnath
(74) *Attorney, Agent, or Firm*—Roylance, Abrams, Berdo & Goodman, L.L.P.

(57) ABSTRACT

An encryption apparatus and method for generating a ciphertext from an input plaintext of the same length as the ciphertext by parallel processing of the input signal. Since a non-delayed signal is synchronized to a delayed signal, an accurate ciphertext is produced. Therefore, the encryption speed is increased, the number of devices for timing synchronization is reduced, an encryption system is stabilized, and production cost is reduced.

12 Claims, 7 Drawing Sheets

ENCRYPTION APPARATUS AND METHOD IN A WIRELESS COMMUNICATIONS SYSTEM

PRIORITY

This application claims priority under 35 U.S.C. § 119 to an application entitled "Encryption Apparatus and Method in a Wireless Communications System" filed in the Korean Industrial Property Office on Oct. 8, 2002 and assigned Serial No. 2002-61179, the contents of which are incorporated herein by reference.

BACKGROUND OF THE INVENTION

1. Field of the Invention

The present invention relates generally to a wireless communications system, and in particular, to an encryption apparatus and method for implementing confidentiality and integrity algorithms in a wireless communications system.

2. Description of the Related Art

As the first generation analog encryption system has evolved into the second generation digital encryption system, more advanced encryption techniques have been used. The current third generation encryption system provides encryption service for multimedia service i.e., audio and video information. Thus, the importance of encryption has increased in order to provide confidentiality to voice signals, multimedia service, and user data. An integrity algorithm is required to authenticate control signals between mobile terminals in a wireless communication system and a network. The $3^{rd}$ Generation Project Partnership (3GPP) has selected the KASUMI algorithm as the f8 confidentiality and f9 integrity algorithms for a third generation system based on a Global System for Mobile communication (GSM) core network, and a Universal Mobile Telecommunication System (UMTS).

FIG. 1 is a block diagram illustrating an example of a conventional KASUMI algorithm. Referring to FIG. 1, KASUMI is an 8-round Feistel unit cipher that provides a 64-bit output ciphertext from a 64-bit input plaintext with 8-round encryption. The 64-bit input signal is divided into a 32-bit signal $L_0$ and a 32-bit signal $R_0$. FLi units ($1 \leq i \leq 8$) 110 to 180 and FOi units ($1 \leq i \leq 8$) 210 to 280 encrypt the signals $L_0$ and $R_0$ under corresponding encryption keys $KL_i$ ($1 \leq i \leq 8$), $KO_i$ ($1 \leq i \leq 8$), and $KI_i$ ($1 \leq i \leq 8$) and output the 64-bit ciphertext.

Encryption in accordance with FIG. 1 occurs in the following manner. An FL1 unit 110 encrypts the input 32-bit signal $L_0$ with an encryption key $KL_1$ and outputs a ciphertext $L_{01}$. An FO1 unit 210 encrypts the 32-bit ciphertext $L_{01}$ with encryption keys $KO_1$ and $KI_1$ and outputs a ciphertext $L_{02}$. An Exclusive-OR operation is performed to logically "exclusive OR" the ciphertext $L_{02}$ and the 32-bit signal $R_0$ to provide a 64-bit ciphertext. This encryption occurs eight times and a final 64-bit ciphertext is generated in the KASUMI.

FIG. 2A is a block diagram illustrating an example of FOi units. Referring to FIG. 2A, FOi denotes an ith FO unit. The FOi unit comprises a plurality of $fl_{i,j}$ sub-ciphers ($1 \leq i \leq 3$, $1 \leq i \leq 3$) to provide 3-rounds of encryption. Here, the operation of the FO1 unit 210 will be described by way of example. The 32-bit input signal is divided into two 16-bit signals $L_0$ and $R_0$. An Exclusive-OR operation is performed to logically "exclusive OR" the 16-bit signal $L_0$ and a 16-bit sub-encryption key $KO_{1,1}$, to provide a signal $L_1$. A $fl_{1,1}$ sub-cipher 201 encrypts the signal $L_1$ with a 16-bit sub-encryption key $KI_{1,1}$ and outputs a signal $L_{1D}$. Meanwhile, a first delay ($D_1$) 10 delays the 16-bit signal $R_0$, which is equivalent to the signal $R_1$, in order to synchronize the 16-bit signal $R_0$ with the signal $L_{1D}$ and output a delayed signal $R_{1D}$. For a second-round of encryption, an Exclusive-OR operation is performed to logically "exclusive OR" the 16-bit signal R1D and a 16-bit sub-encryption key $KO_{1,2}$ to provide a signal $L_2$. A $fl_{1,2}$ sub-cipher 203 encrypts the signal $L_2$ with a 16-bit sub-encryption key $KI_{1,2}$ and outputs a signal $L_{2D}$. Meanwhile, an Exclusive-OR operation is performed to logically "exclusive OR" the 16-bit signal $R_{1D}$ and the signal $L_{1D}$, to provide a signal $R_2$. A second delay ($D_2$) 20 delays the signal $R_2$ in order to synchronize the signal R2 with the signal $L_{2D}$ and output a delayed signal $R_{2D}$. For a third-round of encryption, an Exclusive-OR operation is performed to logically "exclusive OR" the 16-bit signal $R_{2D}$ and a 16-bit sub-encryption key $KO_{1,3}$, resulting in a signal $L_3$. A $fl_{1,3}$ sub-cipher 205 encrypts the signal $L_3$ with a 16-bit sub-encryption key $KI_{1,3}$ and outputs a signal $L_{3D}$. Meanwhile, an Exclusive-OR operation is performed to logically "exclusive OR" the 16-bit signal $R_{2D}$ and the signal $L_{2D}$ to provide a signal $R_3$. A third delay ($D_3$) 30 delays the signal $R_3$ in order to synchronize the signal $R_3$ with the signal $L_{3D}$ and output a delayed signal $R_{3D}$. An Exclusive-OR operation is performed to logically "exclusive OR" the 16-bit signal $R_{3D}$ and the signal $L_{3D}$, to provide a signal $R_4$. The 16-bit signal $R_4$ is operated with the 16-bit signal $R_{3D}$ ($=L_4$), resulting in a 32-bit ciphertext $L_4//R_4$.

The FO1 unit uses the three delays 10, 20 and 30 to synchronize to the output timings of the sub-ciphers 201, 203 and 205.

FIG. 2B is a block diagram illustrating another example of the FOi units. Referring to FIG. 2B, a FOi unit comprises a plurality of $fl_{i',j'}$ sub-ciphers ($1 \leq i' \leq 3$, $1 \leq j' \leq 3$), for 3-rounds of encryption. Here, the FO1 unit 210 will be described by way of example. The 32-bit input signal is divided into two 16-bit signals $L_{0'}$ and $R_{0'}$. An Exclusive-OR operation is performed to logically "exclusive OR" the 16-bit signal $L_{0'}$ and a 16-bit sub-encryption key $KO_{1,1}$, to provide a signal $L_{1'}$. A $fl_{1',1'}$ sub-cipher 211 encrypts the signal $L_{1'}$ with the 16-bit sub-encryption key $KI_{1,1}$ and outputs a signal $L_{1D'}$. Meanwhile, a fourth delay ($D_4$) 40 delays the 16-bit signal $R_{0'}$ ($=R_{1'}$) and outputs a delayed signal $R_{1D'}$. An Exclusive-OR operation is performed to logically "exclusive OR" the signals $L_{1D'}$ and $R_{1D'}$ to provide a signal $L_{2'}$. Simultaneously, an Exclusive-OR operation is performed to logically "exclusive OR" the 16-bit signal $R_{0'}$ and a 16-bit sub-encryption key $KO_{1,2}$, to provide a signal $R_{2'}$. A $fl_{1',2'}$ sub-cipher 213 encrypts the signal $R_{2'}$ with a 16-bit sub-encryption key $KI_{1,2}$ and outputs a signal $R_{2D'}$. An Exclusive-OR operation is performed to logically "exclusive OR" the signals $L_{2'}$ and $R_{2D'}$ to provide a signal $R_{3'}$. Another Exclusive-OR operation is performed to logically "exclusive OR" the signal $L_{2'}$ and a 16-bit sub-encryption key $KO_{1,3}$, to provide a signal $L_{3'}$. A $fl_{1',3'}$ sub-cipher 215 encrypts the signal $L_{3'}$ with a 16-bit sub-encryption key $KI_{1,3}$ and outputs a signal $L_{3D'}$. Meanwhile, a fifth delay ($D_5$) 50 delays the signal $R_{3'}$ and outputs a delayed signal $R_{3D'}$. An Exclusive-OR operation is performed to logically "exclusive OR" the signals $L_{3D'}$ and $R_{3D'}$ to provide a 16-bit signal $L_{4'}$. The 16-bit signal $L_{4'}$ is operated with the 16-bit signal $R_{3D'}$ ($=R_{4'}$), resulting in a 32-bit ciphertext $L_{4'}//R_{4'}$.

The above advanced FOi unit uses the two delays 40 and 50 to synchronize to the output timings of the F1 sub-ciphers 211 and 215. However, due to the use of the delays, a large chip capacity is required.

FIG. 3 is a block diagram illustrating an example of the $fl_{i,j}$ sub-ciphers illustrated in FIGS. 2A and 2B. By way of example, the $fl_{1,1}$ sub-cipher 201 will be described below. Referring to FIG. 3, the 16-bit input signal is divided into a 9-bit signal $RL_0$ and a 7-bit signal $RR_0$. An SBox91 (S91) operator 310 generates a 9-bit signal y0, y1, . . . , y8 from the input signal $RL_0$ using $$y0=(x0x2)\oplus x3\oplus(x2x5)\oplus(x5x6)\oplus(x0x7)\oplus(x1x7)\oplus$$
$$(x2x7)\oplus(x4x8)\oplus(x5x3)\oplus(x7x8)\oplus\text{'}1\text{'};$$

$$y1=x1\oplus(x0x1)\oplus(x2x3)\oplus(x0x4)\oplus(x1x4)\oplus(x0x5)\oplus$$
$$(x3x5)\oplus x6\oplus(x1x7)\oplus(x2x7)\oplus(x5x8)\oplus\text{'}1\text{'};$$

$$y2=x1\oplus(x0x3)\oplus(x3x4)\oplus(x0x5)\oplus(x2x6)\oplus(x3x6)\oplus$$
$$(x5x6)\oplus(x4x7)\oplus(x5x7)\oplus(x6x7)\oplus x8\oplus(x0x8)$$
$$\oplus\text{'}1\text{'};$$

$$y3=x0\oplus(x1x2)\oplus(x0x3)\oplus(x2x4)\oplus x5\oplus(x0x6)\oplus$$
$$(x1x6)\oplus(x4x7)\oplus(x0x8)\oplus(x1x8)\oplus(x7x8);$$

$$y4=(x0x1)\oplus(x1x3)\oplus x4\oplus(x0x5)\oplus(x3x6)\oplus(x0x7)\oplus$$
$$(x6x7)\oplus(x1x0)\oplus(x2x3)\oplus(x3x0);$$

$$y5=x2\oplus(x1x4)\oplus(x4x5)\oplus(x0x6)\oplus(x0x6)\oplus(x3x7)\oplus$$
$$(x4x7)\oplus(x6x7)\oplus(x5x3)\oplus(x6x8)\oplus(x7x8)\oplus\text{'}1\text{'};$$

$$y6=x0\oplus(x2x3)\oplus(x1x5)\oplus(x2x5)\oplus(x4x5)\oplus(x3x6)\oplus$$
$$(x4x6)\oplus(x5x6)\oplus x7\oplus(x1x8)\oplus(x3x8)\oplus(x5x8)\oplus$$
$$(x7x8);$$

$$y7=(x0x1)\oplus(x0x2)\oplus(x1x2)\oplus x3\oplus(x0x3)\oplus(x2x3)\oplus$$
$$(x4x5)\oplus(x2x6)\oplus(x3x5)\oplus(x2x7)\oplus(x5x7)\oplus$$
$$(x8\oplus\text{'}1\text{'};$$

$$y8=(x0x1)\oplus x2\oplus(x1x2)\oplus(x3x4)\oplus(x1x5)\oplus(x2x5)\oplus$$
$$(x1x6)\oplus(x4x6)\oplus x7\oplus(x2x8)\oplus(x3x8);\quad(1)$$

A ZE1 unit 320 receives the signal $RR_0$, adds two zeroes to the Most Significant Bit (MSB) of the signal $RR_0$, and outputs a 9-bit signal. An Exclusive-OR operation is performed to logically "exclusive OR" the outputs of the S91 operator 310 and the ZE1 unit 320 to provide a 9-bit signal $RL_1$. Another Exclusive-OR operation is performed to logically "exclusive OR" the signal $RL_1$ and a 9-bit sub-encryption key $KI_{1,1,2}$, to provide a 9-bit signal $RL_2$.

A TR1 unit 330 removes two zero bits from the MSBs of the 9-bit signal $RL_1$. An SBox71 (S71) operator 340 generates a 7-bit signal y0, y1, . . . , y6 from the input signal $RR_0$ (=$RR_1$) by $$y0=(x1x3)\oplus x4\oplus(x0x1x1)\oplus x5\oplus(x2x5)\oplus(x3x4x5)$$
$$\oplus x6\oplus(x0x6)\oplus(x1x6)\oplus(x3x6)\oplus(x2x4x6)\oplus$$
$$(x1x5x6)\oplus(x4x5x6);$$

$$y1=(x0x1)\oplus(x1x4)\oplus(x2x4)\oplus x5\oplus(x1x2x5)\oplus$$
$$(x0x3x5)\oplus x5\oplus(x0x2x3)\oplus(x3x6)\oplus(x4x5x6)\text{'}1\text{'};$$

$$y2=x0\oplus(x0x3)\oplus(x2x3)\oplus(x1x2x4)\oplus(x0x3x4)\oplus$$
$$(x1x5)\oplus(x0x2x5)\oplus(x0x5)\oplus(x0x1x6)\oplus(x2x6)\oplus$$
$$(x1x6)\oplus\text{'}1\text{'};$$

$$y3=x1\oplus(x0x1x2)\oplus(x1x4)\oplus(x3x4)\oplus(x0x5)\oplus$$
$$(x0x1x5)\oplus(x2x3x5)\oplus(x1x4x5)\oplus(x2x6)\oplus$$
$$(x1x3x6);$$

$$y4=(x0x2)\oplus x3\oplus(x1x3)\oplus(x1x4)\oplus(x0x1x4)\oplus$$
$$(x2x3x4)\oplus(x0x5)\oplus(x1x3x5)\oplus(x0x4x5)\oplus(x1x6)$$
$$\oplus(x3x6)\oplus(x0x3x6)\oplus(x5x6)\oplus\text{'}1\text{'};$$

$$y5=x2\oplus(x0x2)\oplus(x0x3)\oplus(x1x2x3)\oplus(x0x1x4)\oplus$$
$$(x0x5)\oplus(x2x5)\oplus(x4x5)\oplus(x1x6)\oplus(x1x2x6)\oplus$$
$$(x0x3x6)\oplus(x3x4x6)\oplus(x2x5x6)\oplus\text{'}1\text{'};$$

$$y6=(x1x2)\oplus(x1x1x3)\oplus(x0x4)\oplus(x1x5)\oplus(x3x5)$$
$$\oplus x6\oplus(x0x1x6)\oplus(x2x3x6)\oplus(x1x4x5)\oplus$$
$$(x0x5x6);\quad(2)$$

An Exclusive-OR operation is performed to logically "exclusive OR" the outputs of the $TR_1$ 330 and the S71 operator 340 via a sub-encryption key $KI_{1,1,1}$, to provide a 7-bit signal $RR_2$.

A SBox92 (S92) Operator 350 generates a 9-bit signal y0, y1, . . . , y8 from the signal $RL_2$ by Eq. (1). A ZE2 unit 360 receives the signal $RR_2$, adds two zeroes to the MSB of the signal $RR_2$, and outputs a 9-bit signal. An Exclusive-OR operation is performed to logically "exclusive OR" the outputs of the S92 operator 350 and the ZE2 unit 360 to provide a 9-bit signal $RL_3$. A TR2 unit 370 removes two zero bits from the MSBs of the 9-bit signal $RL_3$. A SBox72 (S72) operator 380 generates a 7-bit signal y0, y1, . . . , y6 from the input signal $RR_2$ (=$RR_3$) using Eq. (2). Another Exclusive-OR operation is performed to logically "exclusive OR" the outputs of the TR2 370 and the S72 operator 380 to provide a 7-bit signal $RR_4$.

The 9-bit signal $RL_3$ (=$RL_4$) and the 7-bit signal $RR_4$ are operated, resulting in a 16-bit ciphertext $RL_4//RR_4$.

As described above, the S91 operator 310 and the S92 operator 350 each sequentially perform an AND operation to perform a logical "AND" and an exclusive-OR operation to perform a logical "Exclusive-OR" using Eq. (1), to thereby generate an output signal y0, y1, . . . , y8. Similarly, the S71 operator 340 and the S72 operator 380 sequentially perform an AND operation to perform a logical "AND" and an exclusive-OR operation to perform a logical "Exclusive-OR" using Eq. (2), to thereby generate an output signal y0, y1, . . . , y6. Consequently, the encryption speed is decreased. Moreover, a gate delay involved in the operations of the S91, S92, S71 and S72 operators 310, 350, 340, and 360 gradually increases glitch.

SUMMARY OF THE INVENTION

It is, therefore, an object of the present invention to provide an encryption method for generating a ciphertext bit stream of length $2n$ from a plaintext bit stream of length $2n$.

It is another object of the present invention to provide an encryption apparatus for generating a ciphertext bit stream of length $2n$ from a plaintext bit stream of length $2n$.

To achieve the above objects, in an encryption method for dividing a first plaintext bit stream of length $2n$ into first and second sub-bit streams of length n, dividing a second plaintext bit stream of length $2n$ into third and fourth sub-bit streams of length n, and generating a ciphertext bit stream of length $2n$ from the first, second, third and fourth sub-bit streams using 2-rounds of encryption, first and second ciphertext bit streams of length n are generated by encrypting the first and second sub-bit streams with predetermined first encryption codes $KO_{1,1}$, $KO_{1,2}$, $KO_{1,3}$, $KI_{1,1}$, $KI_{1,2}$, and $KI_{1,3}$, the second ciphertext bit stream being output with a predetermined time delay from the first ciphertext bit stream, in a first-round encryption. A first operated ciphertext bit stream is generated by performing a logical exclusive-OR-operation on the first ciphertext bit stream and the third sub-bit stream, and a second operated ciphertext bit stream is operated by performing a logical exclusive-OR-operation on the second ciphertext bit stream and the fourth sub-bit stream. In a second-round of encryption, third and fourth ciphertext bit streams of length n are generated by encrypting the first operated ciphertext bit stream and the second operated ciphertext bit stream with predetermined second encryption codes $KO_{2,1}$, $KO_{2,2}$, $K_{2,3}$, $KI_{2,1}$, $KI_{2,2}$, and $KI_{2,3}$ and the third and fourth ciphertext bit streams a concurrently output.

In an encryption apparatus for dividing a first plaintext bit stream of length $2n$ into first and second sub-bit streams of length n, dividing a second plaintext bit stream of length $2n$ into third and fourth sub-bit streams of length n, and generating a ciphertext bit stream of length $2n$ from the first, second, third and fourth sub-bit streams using 2-rounds of encryption, a first ciphering unit receives the first and second sub-bit streams, and generates first and second ciphertext bit streams of length n by encrypting the first and second sub-bit streams with predetermined first encryption codes $KO_{1,1}$, $KO_{1,2}$, $KO_{1,3}$, $KI_{1,1}$, $KI_{1,2}$, and $KI_{1,3}$. Here, the second ciphertext bit stream is output with a predetermined time delay from the first ciphertext bit stream. An operating unit generates a first operated ciphertext bit stream by performing a logical exclusive-OR operation on the first ciphertext bit stream and the third sub-bit stream, and generates a second operated ciphertext bit stream by performing a logical exclusive-OR-operation on the second ciphertext bit stream with the fourth sub-bit stream. A second ciphering unit receives the first operated ciphertext bit stream and the second operated ciphertext bit stream having the predetermined time delay, generates third and fourth ciphertext bit streams of length n by encrypting the first operated ciphertext bit stream and the second operated ciphertext bit stream with predetermined second encryption codes $KO_{2,1}$, $KO_{2,2}$, $KO_{2,3}$, $KI_{2,1}$, $KI_{2,2}$, and $KI_{2,3}$ and concurrently outputs the third and fourth ciphertext bit streams.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will be described herein below with reference to the accompanying drawings. Also, a description of known functions and configurations have been omitted for conciseness.

A KASUMI algorithm according to the present invention is a ciphering algorithm used as the f8 confidentiality and f9 integrity algorithms. The f8 confidentiality algorithm encrypts a plaintext signal having a predetermined number of bits by exclusive-OR-operating the plaintext with an encryption key and decrypts a ciphertext by exclusive-OR-operating the ciphertext with the encryption key. The f9 integrity algorithm derives a message authentication code from a received signal. The KASUMI algorithm, as previously discussed, has emerged as a significant issue to confidentiality and integrity.

Figure 1:
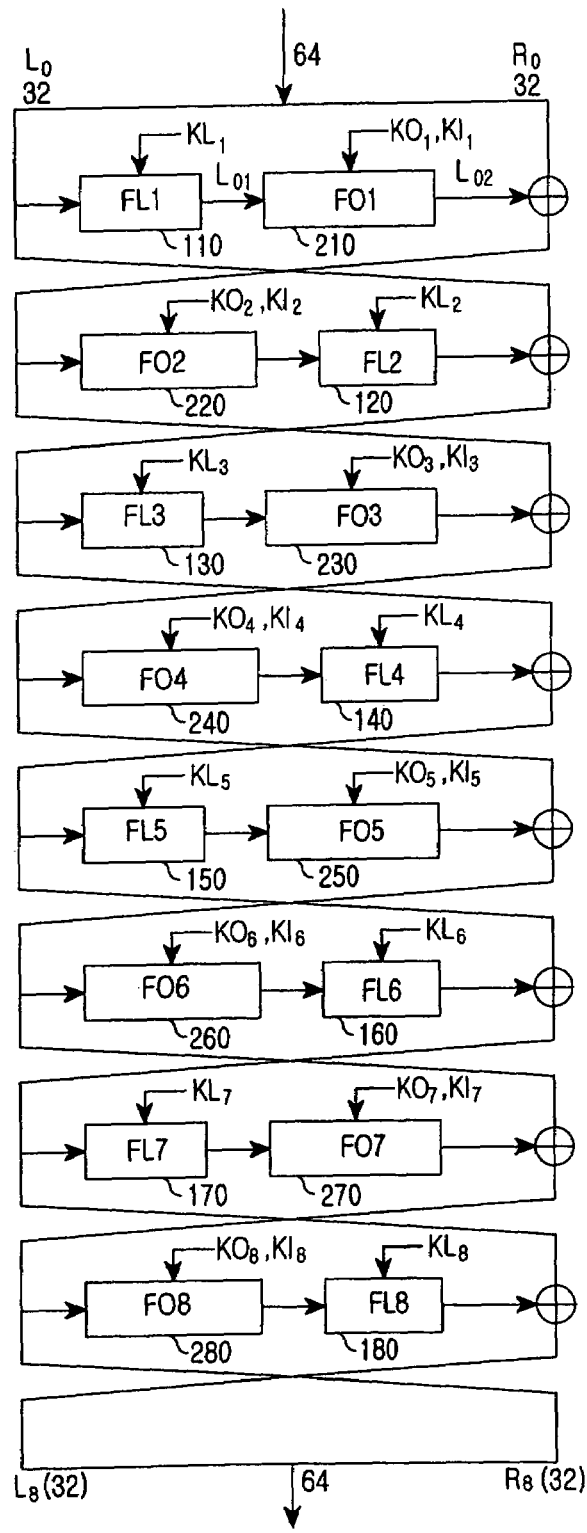
FIG. 1 is a block diagram illustrating an example of a conventional KASUMI algorithm.
Figure 2A:
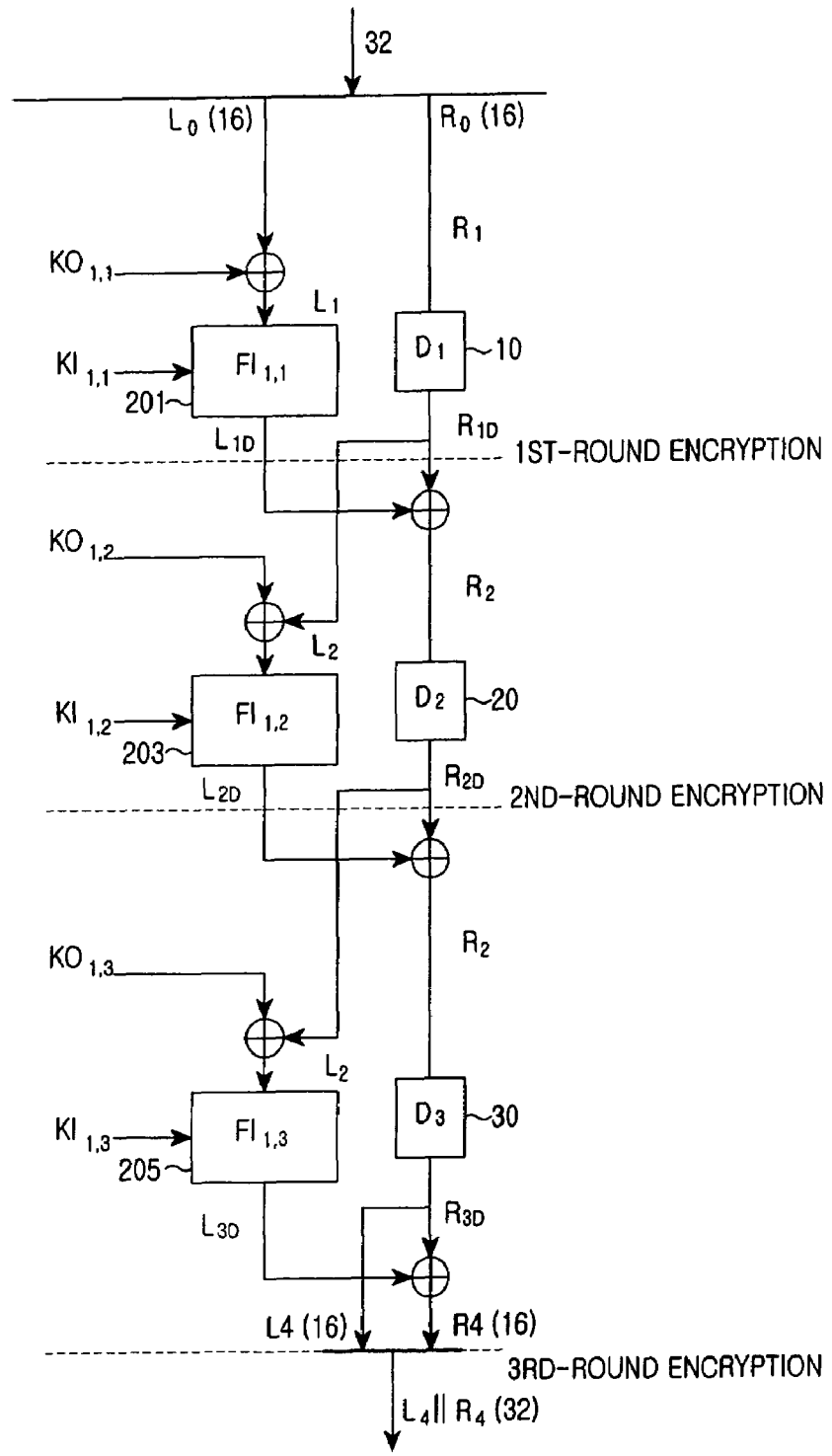
FIG. 2A is a block diagram illustrating an example of FOi units illustrated in FIG. 1.
Figure 2B:
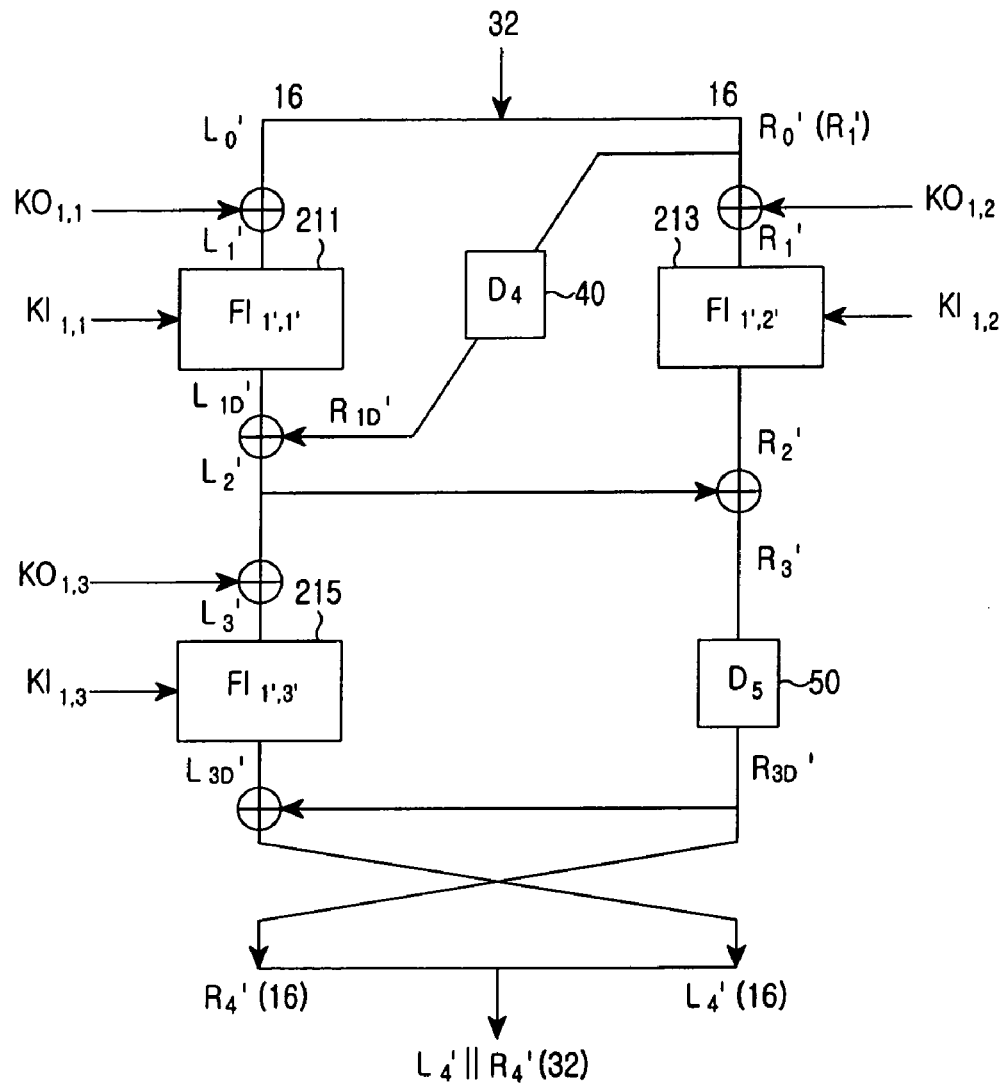
FIG. 2B is a block diagram illustrating another example of the FOi units illustrated in FIG. 1.
Figure 3:
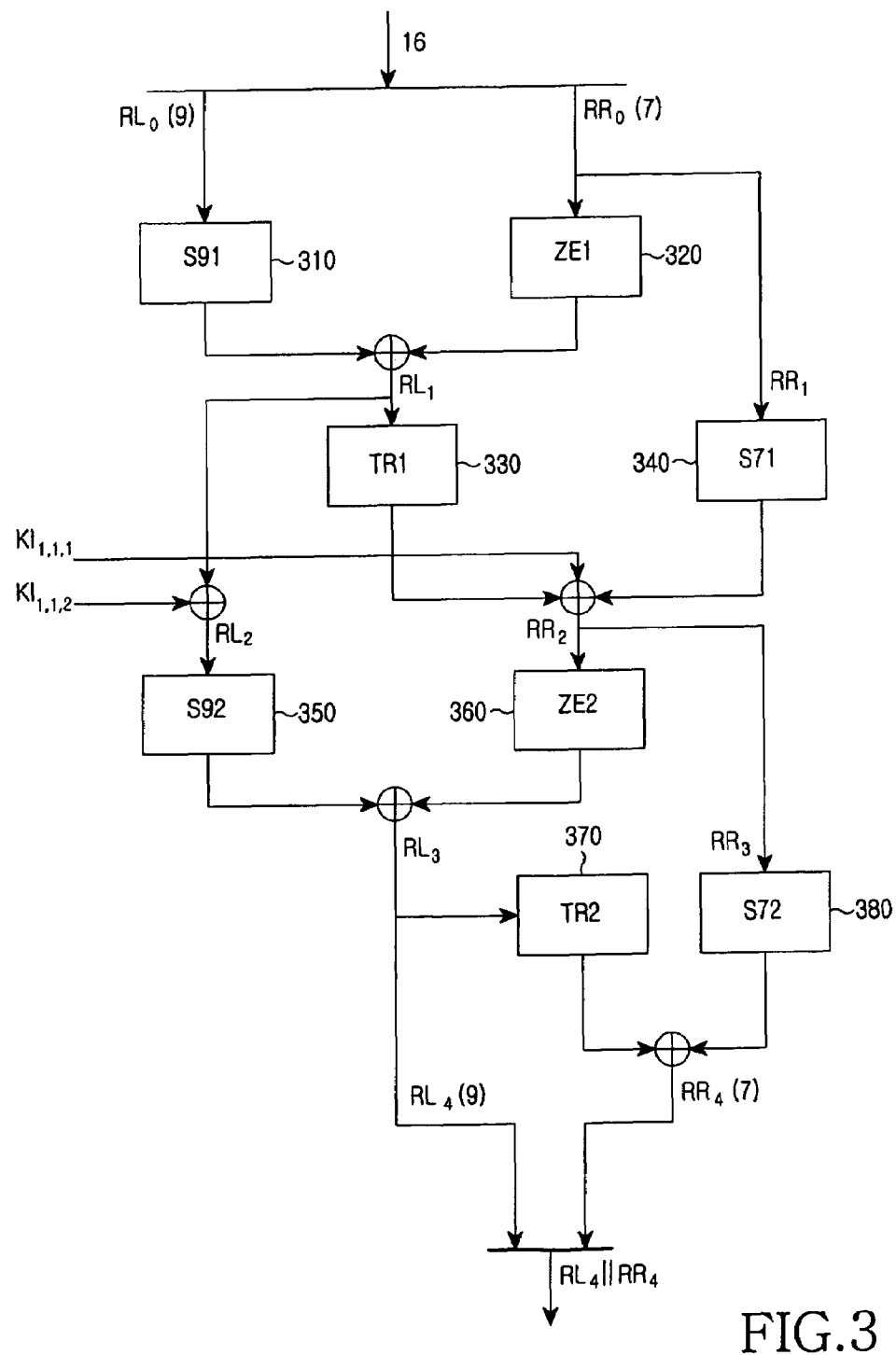
FIG. 3 is a block diagram illustrating an example of $fl_{i,j}$ sub-ciphers illustrated in FIGS. 2A and 2B.
Figure 4:
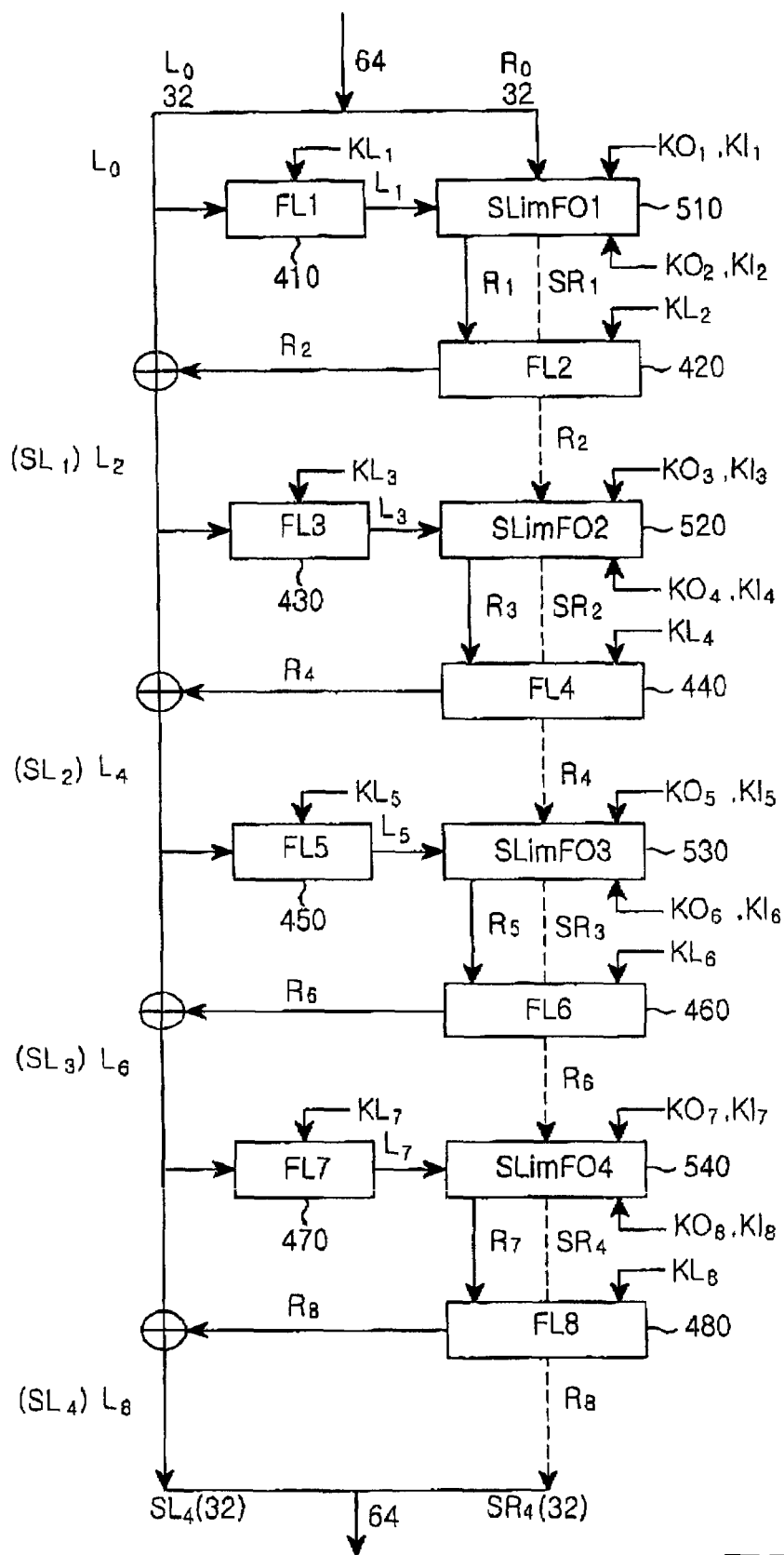
FIG. 4 is a block diagram illustrating an example of a KASUMI algorithm according to the present invention.

FIG. 4 is a block diagram illustrating an example of a KASUMI algorithm according to the present invention. Referring to FIG. 4, a KASUMI of the present invention provides a 64-bit output ciphertext from a 64-bit input plaintext using first, second and third encryption keys. The 64-bit input signal is divided into a 32-bit signal $L_0$ and another 32-bit signal $R_0$. FLi units ($1 \leq i \leq 8$) 410 to 480 and SLIMFOi units ($1 \leq i \leq 4$) 510 to 540 are used to encrypt the signals $L_0$ and $R_0$ using corresponding encryption keys $KO_i$ ($1 \leq i \leq 8$) and $KI_i$ ($1 \leq i \leq 8$) to output a 64-bit ciphertext.

Describing FIG. 4 in more detail, an FL1 unit 410 encrypts the input 32-bit signal $L_0$ with an encryption key $KL_1$ and outputs a ciphertext $L_1$. An SLIMFO1 unit 510 encrypts the 32-bit ciphertext $L_1$ with encryption keys $KO_1$ and $KI_1$, outputs a signal $SR_1$ by encrypting the signal $L_1$ with the 32-bit signal $R_0$, and then outputs a signal $R_1$ by encrypting the signal $SR_1$ with encryption keys $KO_2$ and $KI_2$. An FL2 unit 420 encrypts the signal $R_1$ with an encryption key $KL_2$ and outputs a ciphertext $R_2$. An Exclusive-OR operation is performed to logically "exclusive OR" the signals $L_0$ and $R_2$ to provide a signal $L_2 (=SL_1)$.

An FL3 unit 430 encrypts the signal $L_2$ with an encryption key $KL_3$ and outputs a ciphertext $L_3$. An SLIMFO2 unit 520 encrypts the signal $L_3$ with encryption keys $KO_3$ and $KI_3$, outputs a signal $SR_2$ by operating the encrypted signal $L_3$ with the signal $SR_1$, and then outputs a signal $R_3$ by encrypting the signal $SR_2$ with encryption keys $KO_4$ and $KI_4$. An FL4 unit 440 encrypts the signal $R_3$ with an encryption key $KL_4$ and outputs a ciphertext $R_4$. An Exclusive-OR operation is performed to logically "exclusive OR" the signals $L_2 (=SL_1)$ and $R_4$ to provide a signal $L_4 (=SL_2)$.

An FL5 unit 450 encrypts the signal $L_4$ with an encryption key $KL_5$ and outputs a ciphertext $L_5$. An SLIMFO3 unit 530 encrypts the signal $L_5$ with encryption keys $KO_5$ and $KI_5$, outputs a signal $SR_3$ by operating the encrypted signal $L_3$ with the signal $SR_2$, and then outputs a signal $R_5$ by encrypting the signal $SR_3$ with encryption keys $KO_6$ and $KI_6$. An FL6 unit 460 encrypts the signal $R_5$ with an encryption key $KO_6$ and outputs a ciphertext $R_6$. An Exclusive-OR operation is performed to logically "exclusive OR" the signals $L_4 (=SL_2)$ and $R_6$ to provide a signal $L_6 (=SL_3)$.

An FL7 unit 470 encrypts the signal $L_6$ with an encryption key $KL_7$ and outputs a ciphertext $L_7$. An SLIMFO4 unit 540 encrypts the signal $L_7$ with encryption keys $KO_7$ and $KI_7$, outputs a signal $SR_4$ by operating the encrypted signal $L_7$ with the signal $SR_3$, and then outputs a signal $R_7$ by encrypting the signal $SR_4$ with encryption keys $KO_8$ and $KI_8$. An FL8 unit 480 encrypts the signal $R_7$ with an encryption key $KL_8$ and outputs a ciphertext $R_8$. The signals $L_6 (=SL_3)$ and $R_8$ are exclusive-OR-operated, resulting in a signal $L_8 (=SL_4)$. Consequently, the eight FLi units ($1 \leq i \leq 8$) 410 to 480 and the four SLIMFOi units ($1 \leq i \leq 4$) 510 to 540 encrypt the 64-bit plaintext and output the 64-bit ciphertext, that is, the 32-bit signal $SL_4$//the 32-bit $SR_4$.

Figure 5:
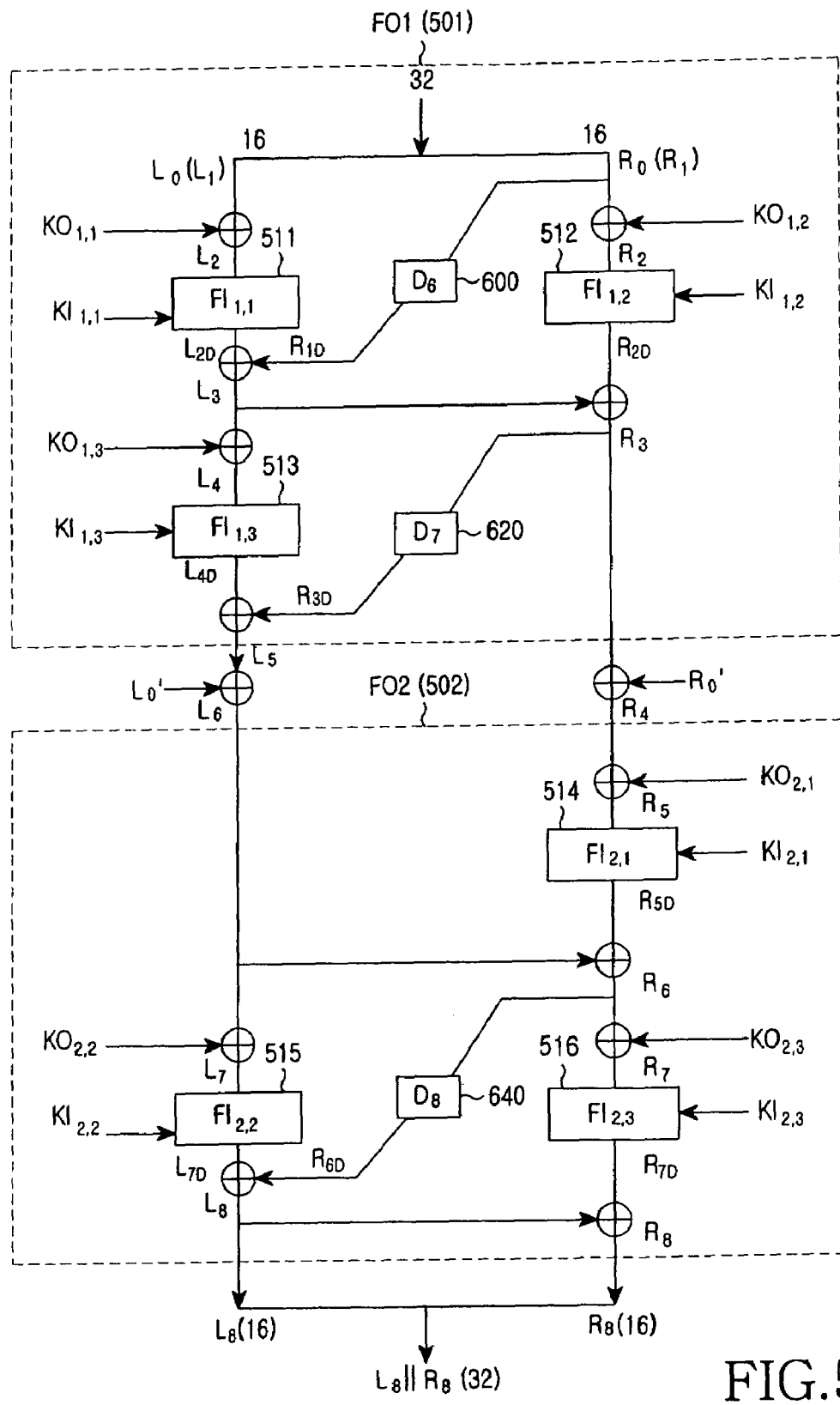
FIG. 5 is a block diagram illustrating an example of SLIMFOi units illustrated in FIG. 4 according to the present invention.

FIG. 5 is a block diagram illustrating an example of the SLIMFOi units illustrated in FIG. 4 according to an embodiment of the invention. Referring to FIG. 5, a SLIMFOi unit is an ith SLIMFO unit and implemented using parallel operations of signals in two FOi units. The SLIMFO1 unit 510 of FIG. 4 will be described by way of example. The SLIMFO1 unit 510 comprises an FO1 cipher 501 and an FO2 cipher 502. Each FO cipher includes $fl_{i,j}$ sub-ciphers ($1 \leq i \leq 2$, $1 \leq j \leq 3$), for 3-round encryption.

The signal resulting from encrypting the 32-bit signal $L_0$ with the encryption key $KL_1$ in FIG. 4 is divide into a 16-bit signal $L_0 (=L_1)$ and a 16-bit signal $R_0 (=R_1)$ in the FO1 cipher 501. A signal $L_2$ is generated by performing a logical exclusive-OR operation on the signal $L_1$ with a sub-encryption key $KO_{1,1}$. An $fl_{1,1}$ sub-cipher 511 generates a signal $L_{2D}$ by encrypting the signal $L_2$ with a sub-encryption key $KI_{1,1}$. A delay (D6) 600 delays the signal $R_1$ and outputs a delayed signal $R_{1D}$. A signal $L_3$ is generated by performing a logical exclusive-OR operation on the signals $R_{1D}$ and $L_{2D}$. Meanwhile, a signal $R_2$ is generated by performing a logical exclusive-OR operation on the signal $R_1$ with a sub-encryption key $KO_{1,2}$. An $FL_{1,2}$ sub-cipher 512 generates a signal $R_{2D}$ by encrypting the signal $R_2$ with a sub-encryption key $KI_{1,2}$. A signal $R_3$ is generated by performing a logical exclusive-OR operation on the signals $R_{2D}$ and $L_3$. A signal $L_4$ is generated by performing a logical exclusive-OR operation on the signal $L_3$ with a sub-encryption key $KO_{1,3}$. An $fl_{1,3}$ sub-cipher 513 generates a signal $L_{4D}$ by encrypting the signal $L_4$ with a sub-encryption key $KI_{1,3}$. A delay (D7) 620 delays the signal $R_3$ and outputs a delayed signal $R_{3D}$. A 16-bit signal $L_5$ is generated by performing a logical exclusive-OR operation on the signals $R_{3D}$ and $L_{4D}$.

The 32-bit signal $R_0$ which was divided from the 64-bit signal in FIG. 4 is further divided into a 16-bit signal $L_{0'}$ and a 16-bit signal $R_{0'}$ in the FO2 cipher 502. A signal $L_6$ is generated by performing a logical exclusive-OR operation on the signal $L_{0'}$ using the 16-bit signal $L_5$. Meanwhile, a signal $R_4$ is generated by performing a logical exclusive-OR operation on the signal $R_{0'}$ using the 16-bit signal $R_3$. A signal $R_5$ is generated by performing a logical exclusive-OR operation on the signal $R_4$ using a sub-encryption key $KO_{2,1}$. An $fl_{2,1}$ sub-cipher 514 generates a signal $R_{5D}$ by encrypting the signal $R_5$ with a sub-encryption key $KI_{2,1}$. A signal $R_6$ is generated by performing a logical exclusive-OR operation on the signals $R_{5D}$ and $L_6$. That is, the $fl_{1,3}$ sub-cipher 513 and the $fl_{2,1}$ sub-cipher 514 synchronize the signal $L_6$ to the signal $R_6$ without using delays. A signal $L_7$ is generated by performing a logical exclusive-OR operation on the signal $L_6$ with a 16-bit sub-encryption key $KO_{2,2}$. An $fl_{2,2}$ sub-cipher 515 generates a signal $L_{7D}$ by encrypting the signal $L_7$ with a 16-bit sub-encryption key $KI_{2,2}$. A delay (D8) 640 delays the signal $R_6$ and outputs a delayed signal $R_{6D}$. A signal $L_8$ is generated by performing a logical exclusive-OR operation on the signals $L_{7D}$ and $R_{6D}$. A signal $R_7$ is generated by performing a logical exclusive-OR operation on the signal $R_6$ with a 16-bit sub-encryption key $KO_{2,3}$. An $fl_{2,3}$ sub-cipher 516 generates a signal $R_{7D}$ by encrypting the signal $R_7$ with a 16-bit sub-encryption key $KI_{2,3}$. A signal $R_8$ is generated by performing a logical exclusive-OR operation on the signals $R_{7D}$ and $L_8$. Consequently, a 32-bit ciphertext $L_8 \| R_8$ is generated by operating the 16-bit signal $L_8$ with the 16-bit signal $R_8$.

As described above, the SLIMFO1 unit encrypts the input plaintext by processing the 16-bit signals $L_0$ and $R_0$ in parallel in the FO1 cipher 501 and processing the 16-bit signals $L_{0'}$ and $R_{0'}$ in parallel in the FO2 cipher 502. The parallel processing of the 32-bit signals $L_0$ and $R_0$ which were divided from the 64-bit input signal in the SLIMFOi units remarkably increases encryption speed and reduces the number of delays used to synchronize a delayed signal to a non-delayed signal.

Figure 6:
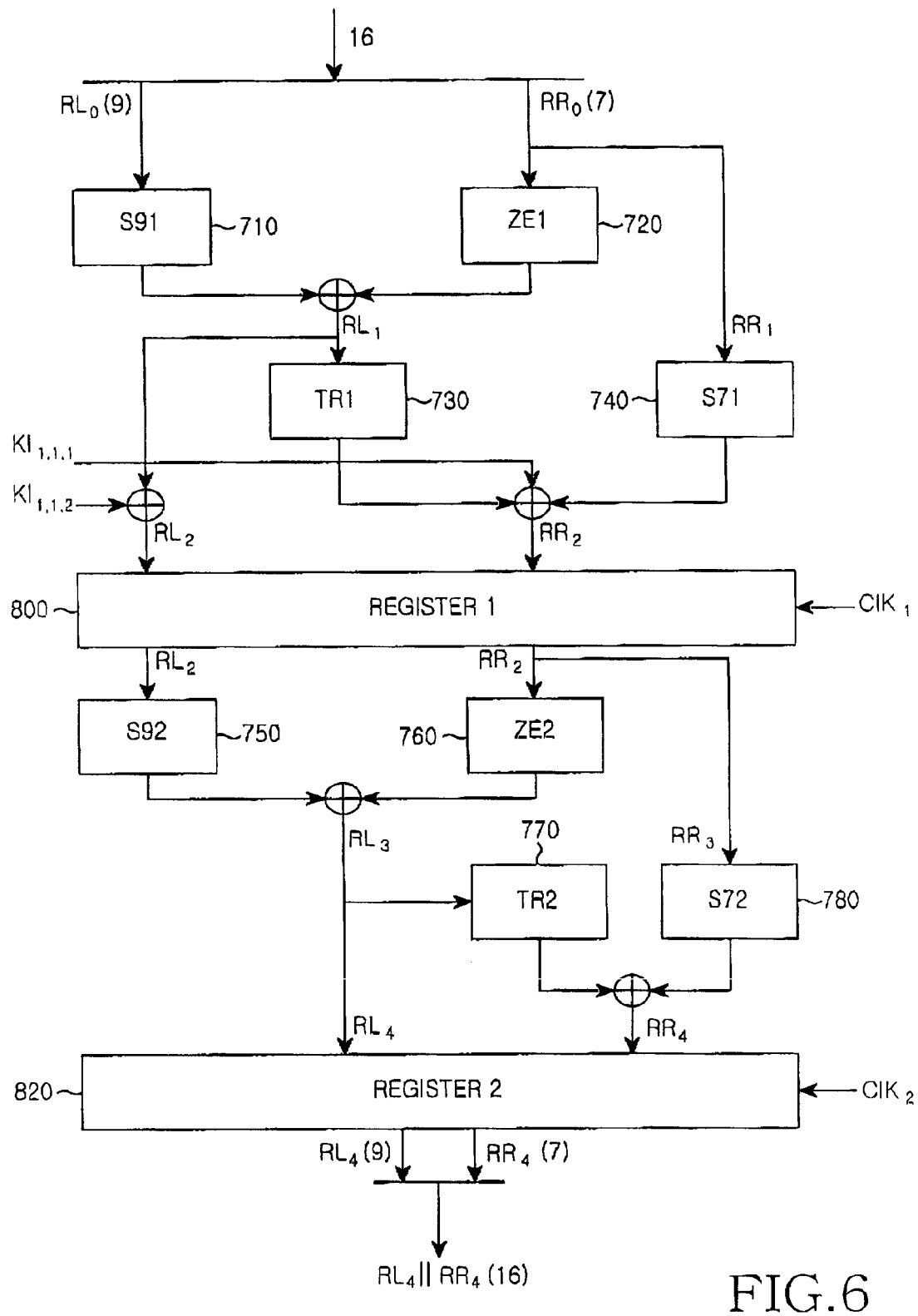
FIG. 6 is a block diagram illustrating an example of $fl_{i,j}$ sub-ciphers illustrated in FIG. 5 according to the present invention.

FIG. 6 is a block diagram illustrating an example of the $fl_{i,j}$ sub-ciphers illustrated in FIG. 5 according to an embodiment of the invention. By way of example, the $fl_{1,1}$ sub-cipher 511 will be described below.

Referring to FIG. 6, the $fl_{1,1}$ sub-cipher 511 includes a first ciphering unit and a second ciphering unit. In the first ciphering unit, a 16-bit input signal is divided into a 9-bit signal $RL_0$ and a 7-bit signal $RR_0$. An S91 operator 710 generates a 9-bit signal y0, y1, ..., y8 from the input signal $RL_0$ by $$y0 = (x0x2) \oplus x3 \oplus (x2x5) \oplus (x5x6) \oplus (x0x7) \oplus (x1x7) \oplus (x2x7) \oplus (x4x8) \oplus (x5x3) \oplus (x7x8) \oplus \text{'1'};$$

$$y1 = x1 \oplus (x0x1) \oplus (x2x3) \oplus (x0x4) \oplus (x1x4) \oplus (x0x5) \oplus (x3x5) \oplus x6 \oplus (x1x7) \oplus (x2x7) \oplus (x5x8) \oplus \text{'1'};$$

$$y2 = x1 \oplus (x0x3) \oplus (x3x4) \oplus (x0x5) \oplus (x2x6) \oplus (x3x6) \oplus (x5x6) \oplus (x4x7) \oplus (x5x7) \oplus (x6x7) \oplus x8 \oplus (x0x8) \oplus \text{'1'};$$

$$y3 = x0 \oplus (x1x2) \oplus (x0x3) \oplus (x2x4) \oplus x5 \oplus (x0x6) \oplus (x1x6) \oplus (x4x7) \oplus (x0x8) \oplus (x1x8) \oplus (x7x8);$$

$$y4 = (x0x1) \oplus (x1x3) \oplus x4 \oplus (x0x5) \oplus (x3x6) \oplus (x0x7) \oplus (x6x7) \oplus (x1x8) \oplus (x2x3) \oplus (x3x8);$$

$$y5 = x2 \oplus (x1x4) \oplus (x4x5) \oplus (x0x6) \oplus (x1x6) \oplus (x3x7) \oplus (x4x7) \oplus (x6x7) \oplus (x5x3) \oplus (x6x8) \oplus (x7x8) \oplus \text{'1'};$$

$$y6 = x0 \oplus (x2x3) \oplus (x1x5) \oplus (x2x5) \oplus (x4x5) \oplus (x3x6) \oplus (x4x6) \oplus (x5x6) \oplus x7 \oplus (x1x8) \oplus (x3x8) \oplus (x5x8) \oplus (x7x8);$$

$$y7 = (x0x1) \oplus (x0x2) \oplus (x1x2) \oplus x3 \oplus (x0x3) \oplus (x2x3) \oplus (x4x5) \oplus (x2x6) \oplus (x3x5) \oplus (x2x7) \oplus (x5x7) \oplus x8 \oplus \text{'1'};$$

$$y8 = (x0x1) \oplus x2 \oplus (x1x2) \oplus (x3x4) \oplus (x1x5) \oplus (x2x5) \oplus (x1x6) \oplus (x4x6) \oplus x7 \oplus (x2x8) \oplus (x3x8); \quad (3)$$

That is, the S91 operator 710 generates the 9-bit signal y0, y2, ..., y8 by performing parallel logical AND operations and then performing a logical exclusive-OR operation of a 9-bit signal x0, x1, ..., x8 in parallel. A ZE1 unit 720 receives the signal $RR_0$, adds two zeroes to the MSB of the signal $RR_0$, and outputs a 9-bit signal. An Exclusive-OR operation is performed to logically "exclusive OR" the outputs of the S91 operator 710 and the ZE1 unit 720 to provide a 9-bit signal $RL_1$. Another Exclusive-OR operation is performed to logically "exclusive OR" the signal $RL_1$ and a 9-bit sub-encryption key $KI_{1,1,2}$, to provide a 9-bit signal $RL_2$. The signal $RL_2$ is temporarily stored in a first register (register 1) 800.

Simultaneously, an S71 operator 740 generates a 7-bit signal y0, y1, ..., y6 from the input signal $RR_0$ ($=RR_1$) by $$y0 = (x1x3) \oplus x4 \oplus (x0x1x4) \oplus x5 \oplus (x2x5) \oplus (x3x4x5) \oplus x6 \oplus (x0x6) \oplus (x1x6) \oplus (x3x6) \oplus (x2x4x6) \oplus (x1x5x6) \oplus (x4x5x6);$$

$$y1 = (x0x1) \oplus (x1x4) \oplus (x2x4) \oplus x5 \oplus (x1x2x5) \oplus (x0x3x5) \oplus x6 \oplus (x0x2x3) \oplus (x3x6) \oplus (x4x5x6) \oplus \text{'1'};$$

$$y2 = x0 \oplus (x0x3) \oplus (x2x3) \oplus (x1x2x4) \oplus (x0x3x4) \oplus (x1x5) \oplus (x0x2x5) \oplus (x0x5) \oplus (x0x4x6) \oplus (x2x6) \oplus (x4x6) \oplus \text{'1'};$$

$$y3 = x1 \oplus (x0x1x2) \oplus (x1x4) \oplus (x3x4) \oplus (x0x5) \oplus (x0x1x5) \oplus (x2x3x5) \oplus (x1x4x5) \oplus (x2x6) \oplus (x1x3x6);$$

$$y4 = (x0x2) \oplus x3 \oplus (x1x3) \oplus (x1x4) \oplus (x0x1x4) \oplus (x2x3x4) \oplus (x0x5) \oplus (x1x3x5) \oplus (x0x4x5) \oplus (x1x6) \oplus (x3x6) \oplus (x0x3x6) \oplus (x5x6) \oplus \text{'1'};$$

$$y5 = x2 \oplus (x0x2) \oplus (x0x3) \oplus (x1x2x3) \oplus (x0x1x4) \oplus (x0x5) \oplus (x2x5) \oplus (x4x5) \oplus (x1x6) \oplus (x1x2x6) \oplus (x0x3x6) \oplus (x3x4x6) \oplus (x2x5x6) \oplus \text{'1'};$$

$$y6 = (x1x2) \oplus (x1x1x3) \oplus (x0x4) \oplus (x1x5) \oplus (x3x5) \oplus x6 \oplus (x0x1x6) \oplus (x2x3x6) \oplus (x1x4x5) \oplus (x0x5x6); \quad (4)$$

That is, the S71 operator 740 generates the 7-bit signal y0, y2, ..., y6 by performing parallel logical AND operations and then performing a logical exclusive-OR operation of a 7-bit signal x0, x1, ..., x6 in parallel. A TR1 unit 730 removes two zeroes from the MSBs of the 9-bit signal $RL_1$ and outputs the resulting 7-bit signal. A 7-bit signal $RR_2$ is generated by performing a logical exclusive-OR operation on the outputs of the TR1 730 and the S71 operator 740 with a sub-encryption key $KI_{1,1,1}$. The signal $RR_2$ is temporarily stored in the first register 800. Upon receipt of a first clock signal CLK1 from a controller (not shown), the register 800 simultaneously outputs the 9-bit signal $RL_2$ and the 7-bit signal $RR_2$. Thus the register 800 functions to synchronize the output timings of signals according to delay involved with encryption in the S91 operator 710, the ZE1 unit 720, the TR1 unit 730, and the S71 operator 740.

In the second ciphering unit, an S92 operator 750 generates a 9-bit signal y0, y1, ..., y8 from the 9-bit signal $RL_2$ received from the register 800 using Eq. (3). A ZE2 unit 760 adds two zeroes to the MSB of the signal $RR_2$ received from the register 800 and outputs a 9-bit signal. An Exclusive-OR operation is performed to logically "exclusive OR" the outputs of the S92 operator 750 and the ZE2 unit 760 to provide a 9-bit signal $RL_3$. The signal $RL_3$ is temporarily stored in a second register (register 2) 820.

Simultaneously, an S72 operator 780 generates a 7-bit signal y0, y1, ..., y6 from the 7-bit signal $RR_2$ (=$RR_3$) using Eq. (4). A TR2 unit 770 removes two zeroes from the MSBs of the 9-bit signal $RL_3$ and outputs the resulting 7-bit signal. A 7-bit signal $RR_4$ is generated by performing a logical exclusive-OR-operation on the outputs of the $TR_2$ 770 and the S72 operator 780. The signal $RR_4$ is temporarily stored in the second register 820.

Upon receipt of a second clock signal CLK2 from the controller; the register 820 simultaneously outputs the 9-bit signal $RL_4$ and the 7-bit signal $RR_4$. Thus the register 820 functions to synchronize the output timings of signals according to the delay involved with the encryption in the S92 operator 750, the ZE2 unit 760, the TR2 unit 770, and the S72 operator 780.

As described above, the S91 operator 710 and the S92 operator 750 each output a 9-bit signal y0, y1, ..., y8 by performing parallel logical AND operations and then performing a logical exclusive-OR operation according to Eq. (3). The S71 operator 740 and the S72 operator 780 each output a 7-bit signal y0, y1, ..., y6 by parallel AND operations and then exclusive-OR operation according to Eq. (4). Therefore, encryption speed is remarkably increased. Furthermore, the use of the registers 800 and 820 for signal timing synchronization enables output of an accurate ciphertext.

In accordance with the present invention, (1) parallel computation of input signals increases signal processing speed; (2) due to synchronization of the output timings of a delayed signal and a non-delayed signal, an accurate ciphertext is achieved and thus an encryption system is further stabilized; and (3) the decrease in devices used for synchronization reduces required chip capacity and production cost.

While the invention has been shown and described with reference to a certain embodiment thereof, it will be understood by those skilled in the art that various changes in form and details may be made therein without departing from the spirit and scope of the invention as defined by the appended claims.

What is claimed is:

1. An encryption method for dividing a first plaintext bit stream of length $2n$ into first and second sub-bit streams of length n, dividing a second plaintext bit stream of length $2n$ into third and fourth sub-bit streams of length n, and generating a ciphertext bit stream of length $2n$ from the first, second, third and fourth sub-bit streams using 2-rounds of encryption, the method comprising the steps of:

performing the first-round of encryption by encrypting the received first and second sub-bit streams with predetermined first encryption codes an odd number of times and outputting first and second ciphertext bit streams, wherein the first ciphertext bit stream is encrypted a first number of times and the second ciphertext bit stream is encrypted a second number of times, the second number of times exceeding the first number of times;

generating a first operated ciphertext bit stream by performing a logical exclusive-OR-operation on the first ciphertext bit stream and the third sub-bit stream;

generating a second operated ciphertext bit stream by performing a logical exclusive-OR operation on the second ciphertext bit stream and the fourth sub-bit stream; and performing the second-round of encryption by encrypting the received first operated ciphertext bit stream and the second operated ciphertext bit stream with predetermined second encryption codes an odd number of times and concurrently outputting third and fourth ciphertext bit streams of length n, wherein the third ciphertext bit stream is encrypted a third number of times and the fourth ciphertext bit stream is encrypted the fourth number of times, the fourth number of times exceeding the third number of times, wherein the last encryption for the second ciphertext bit stream in the first-round is performed at the same time of performing the first encryption of the first operated ciphertext bit stream in the second round of encryption.

2. The encryption apparatus of claim 1, wherein the predetermined first encryption codes comprises at least one of $KO_{1,1}$, $KO_{1,2}$, $KO_{1,3}$, $KI_{1,1}$, $KI_{1,2}$, and $KI_{1,3}$.

3. The encryption apparatus of claim 1, wherein the predetermined second encryption codes comprises at least one of $KO_{2,1}$, $KO_{2,2}$, $KO_{2,3}$, $KI_{2,1}$, $KI_{2,2}$, and $KI_{2,3}$.

4. The encryption method of claim 2, wherein the first-round encryption step comprises the steps of:

generating a first signal by performing a logical exclusive-OR operation on the first sub-bit stream and the first encryption code $KO_{1,1}$ to provide a first exclusive-OR operated bitstream, encrypting the first exclusive-OR-operated bit stream with the first encryption code $KI_{1,1}$ to provide a first encrypted signal, and performing a logical exclusive-OR operation on the first encrypted signal and the second sub-bit stream delayed by time required for the encryption;

generating the first operated ciphertext bit stream by performing a logical exclusive-OR-operation on the second sub-bit stream and the first encryption code $KO_{1,2}$, to provide a second exclusive-OR operated bitstream encrypting the second exclusive-OR-operated bit stream with the first encryption code $KI_{1,2}$ to provide a second encrypted signal, and performing a logical exclusive-OR-operation on the second encrypted signal and the first signal;

generating the second operated ciphertext bit stream by performing a logical exclusive-OR-operation on the first signal and the first encryption code $KO_{1,3}$ to provide a third exclusive-OR operated bitstream, encrypting the third exclusive-OR-operated bit stream with the first encryption code $KI_{1,3}$, and performing a logical exclusive-OR-operation on the encrypted signal with the first sub-bit stream delayed by time required for the encryption.

5. The encryption method of claim 3, wherein the second-round encryption step comprises the steps of:

generating a second signal by performing a logical exclusive-OR-operation on the first operated ciphertext bit stream and the second encryption code $KO_{2,1}$ to provide a fourth exclusive-OR operated bitstream, encrypting the fourth exclusive-OR-operated bit stream with the second encryption code $KI_{2,1}$ to provide a third encrypted signal, performing a logical exclusive-OR-operation on the third encrypted signal and the second operated ciphertext bit stream to provide a fifth exclusive-OR operated bitstream;

generating the third operated ciphertext bit stream by performing a logical exclusive-OR-operation on the second operated ciphertext bit stream and the second encryption code $KO_{2,2}$, encrypting the fifth exclusive-OR-operated bit stream with the second encryption code $KI_{2,2}$ to provide a fourth encrypted signal, and performing a logical exclusive-OR-operation on the fifth encrypted signal and the second signal delayed by time required for the encryption; and generating the fourth ciphertext bit stream by performing a logical exclusive-OR-operation on the second signal and the second encryption code $KO_{2,3}$ encrypting the sixth exclusive-OR-operated bit stream with the second encryption code $KI_{2,3}$, and performing a logical exclusive-OR-operation on the encrypted signal with the third operated ciphertext bit stream.

6. The encryption method of claim 5, wherein each of the encryptions includes first and second sub-encryptions, and outputs from the first and second sub-encryptions are stored and simultaneously retrieved according to an external clock signal.

7. The encryption method of claim 5, wherein a 16-bit input bit stream is divided into a 9-bit stream and a 7-bit stream, a 9-bit ciphertext bit stream is generated from the 9-bit stream using a first equation, and a 7-bit ciphertext bit stream is generated from the 7-bit stream using a second equation in each of the sub-encryptions, wherein said first equation comprises $$y0=(x0x2)\oplus x3\oplus(x2x5)\oplus(x5x6)\oplus(x0x7)\oplus(x1x7)\oplus(x2x7)\oplus(x4x8)\oplus(x5x3)\oplus(x7x8)\oplus`1`;$$

$$y1=x1\oplus(x0x1)\oplus(x2x3)\oplus(x0x4)\oplus(x1x4)\oplus(x0x5)\oplus(x3x5)\oplus x6\oplus(x1x7)\oplus(x2x7)\oplus(x5x8)\oplus`1`;$$

$$y2=x1\oplus(x0x3)\oplus(x3x4)\oplus(x0x5)\oplus(x2x6)\oplus(x3x6)\oplus(x5x6)\oplus(x4x7)\oplus(x5x7)\oplus(x6x7)\oplus x8\oplus(x0x8)\oplus`1`;$$

$$y3=x0\oplus(x1x2)\oplus(x0x3)\oplus(x2x4)\oplus x5\oplus(x0x6)\oplus(x1x6)\oplus(x4x7)\oplus(x0x8)\oplus(x1x8)\oplus(x7x8);$$

$$y4=(x0x1)\oplus(x1x3)\oplus x4\oplus(x0x5)\oplus(x3x6)\oplus(x0x7)\oplus(x6x7)\oplus(x1x0)\oplus(x2x3)\oplus(x3x0);$$

$$y5=x2\oplus(x1x4)\oplus(x4x5)\oplus(x0x6)\oplus(x0x6)\oplus(x3x7)\oplus(x4x7)\oplus(x6x7)\oplus(x5x3)\oplus(x6x8)\oplus(x7x8)\oplus`1`;$$

$$y6=x0\oplus(x2x3)\oplus(x1x5)\oplus(x2x5)\oplus(x4x5)\oplus(x3x6)\oplus(x4x6)\oplus(x5x6)\oplus x7\oplus(x1x8)\oplus(x3x8)\oplus(x5x8)\oplus(x7x8);$$

$$y7=(x0x1)\oplus(x0x2)\oplus(x1x2)\oplus x3\oplus(x0x3)\oplus(x2x3)\oplus(x4x5)\oplus(x2x6)\oplus(x3x5)\oplus(x2x7)\oplus(x5x7)\oplus(x8\oplus`1`;$$

$$y8=(x0x1)\oplus x2\oplus(x1x2)\oplus(x3x4)\oplus(x1x5)\oplus(x2x5)\oplus(x1x6)\oplus(x4x6)\oplus x7\oplus(x2x8)\oplus(x3x8);$$

and said second equation comprises $$y0=(x1x3)\oplus x4\oplus(x0x1x1)\oplus x5\oplus(x2x5)\oplus(x3x4x5)\oplus x6\oplus(x0x6)\oplus(x1x6)\oplus(x3x6)\oplus(x2x4x6)\oplus(x1x5x6)\oplus(x4x5x6);$$

$$y1=(x0x1)\oplus(x1x4)\oplus(x2x4)\oplus x5\oplus(x1x2x5)\oplus(x0x3x5)\oplus x5\oplus(x0x2x3)\oplus(x3x6)\oplus(x4x5x6)`1`;$$

$$y2=x0\oplus(x0x3)\oplus(x2x3)\oplus(x1x2x4)\oplus(x0x3x4)\oplus(x1x5)\oplus(x0x2x5)\oplus(x0x5)\oplus(x0x1x6)\oplus(x2x6)\oplus(x1x6)\oplus`1`;$$

$$y3=x1\oplus(x0x1x2)\oplus(x1x4)\oplus(x3x4)\oplus(x0x5)\oplus(x0x1x5)\oplus(x2x3x5)\oplus(x1x4x5)\oplus(x2x6)\oplus(x1x3x6);$$

$$y4=(x0x2)\oplus x3\oplus(x1x3)\oplus(x1x4)\oplus(x0x1x4)\oplus(x2x3x4)\oplus(x0x5)\oplus(x1x3x5)\oplus(x0x4x5)\oplus(x1x6)\oplus(x3x6)\oplus(x0x3x6)\oplus(x5x6)\oplus`1`;$$

$$y5=x2\oplus(x0x2)\oplus(x0x3)\oplus(x1x2x3)\oplus(x0x1x4)\oplus(x0x5)\oplus(x2x5)\oplus(x4x5)\oplus(x1x6)\oplus(x1x2x6)\oplus(x0x3x6)\oplus(x3x4x6)\oplus(x2x5x6)\oplus`1`;$$

$$y6=(x1x2)\oplus(x1x1x3)\oplus(x0x4)\oplus(x1x5)\oplus(x3x5)\oplus x6\oplus(x0x1x6)\oplus(x2x3x6)\oplus(x1x4x5)\oplus(x0x5x6);$$

8. An encryption apparatus for dividing a first plaintext bit stream of length $2n$ into first and second sub-bit streams of length n, dividing a second plaintext bit stream of length $2n$ into third and fourth sub-bit streams of length n, and generating a ciphertext bit stream of length $2n$ from the first, second, third and fourth sub-bit streams using 2-rounds of encryption, the apparatus comprising:

a first ciphering unit for receiving the first and second sub-bit streams, and generating first and second ciphertext bit streams of length n by encrypting the first and second sub-bit streams with predetermined first encryption codes $KO_{1,1}$, $KO_{1,2}$, $KO_{1,3}$, $KI_{1,1}$, $KI_{1,2}$, and $KI_{1,3}$ an odd number of times, wherein the first ciphertext bit stream is encrypted a first number of times and the second ciphertext bit stream is encrypted a second number of times, the second number of times exceeding the first number of times;

an operating unit for generating a first operated ciphertext bit stream by performing a logical exclusive-OR-operation on the first ciphertext bit stream and the third sub-bit stream and generating a second operated ciphertext bit stream by performing a logical exclusive-OR-operation on the second ciphertext bit stream with the fourth sub-bit stream; and a second ciphering unit for receiving the first operated ciphertext bit stream and the second operated ciphertext bit stream comprising the predetermined time delay, generating third and fourth ciphertext bit streams of length n by encrypting the first operated ciphertext bit stream and the second operated ciphertext bit stream with predetermined second encryption codes $KO_{2,1}$, $KO_{2,2}$, $KO_{2,3}$, $KI_{2,1}$, $KI_{2,2}$, and $KI_{2,3}$ an odd number of times, and concurrently outputting the third and fourth ciphertext bit streams, wherein the third ciphertext bit stream is encrypted a third number of times and the fourth ciphertext bit stream is encrypted the fourth number of times, the fourth number of times exceeding the third number of times, wherein the last encryption for the second ciphertext bit stream in the first-round of encryption is performed at the same time of performing the first encryption for the first operated ciphertext bit stream in the second-round of encryption.

9. The encryption apparatus of claim 8, wherein the first ciphering unit comprises:
  a first block comprising a first exclusive-OR operator for performing a logical exclusive-OR operation on the first sub-bit stream and the first encryption code $KO_{1,1}$, a first sub-cipher for encrypting the exclusive-OR-operated bit stream with the first encryption code $KI_{1,1}$, and a second exclusive-OR operator for generating a first signal by performing a logical exclusive-OR operation on the encrypted signal with the second sub-bit stream being delayed to provide time for the encryption;
  a second block comprising a third exclusive-OR operator for performing a logical exclusive-OR operation on the second sub-bit stream and the first encryption code $KO_{1,2}$, a second sub-cipher for encrypting the exclusive-OR-operated bit stream with the first encryption code $KI_{1,2}$, and a fourth exclusive-OR operator for generating the first operated ciphertext bit stream by performing a logical exclusive-OR operation on the encrypted signal and the first signal; and
  a third block comprising a fifth exclusive-OR operator for performing a logical exclusive-OR operation on the first signal and the first encryption code $KO_{1,3}$, a third sub-cipher for encrypting the exclusive-OR-operated bit stream with the first encryption code $KI_{1,3}$, and a sixth exclusive-OR operator for generating the second operated ciphertext bit stream by performing a logical exclusive-OR-operation on the encrypted signal and the first sub-bit stream delayed by time required for the encryption.

10. The encryption apparatus of claim 8, wherein the second ciphering unit comprises:
  a fourth block comprising a seventh exclusive-OR operator for exclusive-OR-operating the first operated ciphertext bit stream with the second encryption code $KO_{2,1}$, a fourth sub-cipher for encrypting the exclusive-OR-operated bit stream with the second encryption code $KI_{2,1}$, and an eighth exclusive-OR operator for generating a second signal by performing a logical exclusive-OR-operation on the encrypted signal and the second operated ciphertext bit stream;
  a fifth block comprising a ninth exclusive-OR operator for exclusive-OR-operating the second operated ciphertext bit stream with the second encryption code $KO_{2,2}$, a fifth sub-cipher for encrypting the exclusive-OR-operated bit stream with the second encryption code $KI_{2,2}$, and a tenth exclusive-OR operator for generating the third ciphertext bit stream by performing a logical exclusive-OR-operation on the encrypted signal and the second signal delayed by time required for the encryption; and
  a sixth block comprising an eleventh exclusive-OR operator for performing a logical exclusive-OR operation on the second signal with the second encryption code $KO_{2,3}$, a sixth sub-cipher for encrypting the exclusive-OR-operated bit stream with the second encryption code $KI_{2,3}$, and a twelfth exclusive-OR operator for generating the fourth ciphertext bit stream by performing a logical exclusive-OR operation on the encrypted signal and the third ciphertext bit stream.

11. The encryption apparatus of claim 10, wherein each of the first to sixth sub-ciphers includes first and second sub-ciphering units, and a register for storing the outputs of the first and second sub-ciphering units and simultaneously retrieving the outputs according to an external clock signal.

12. The encryption apparatus of claim 11, wherein each of the first and second sub-ciphering units divides a 16-bit input bit stream into a 9-bit stream and a 7-bit stream, and generates a 9-bit ciphertext bit stream from the 9-bit stream using a third equation, and a 7-bit ciphertext bit stream from the 7-bit stream using a fourth equation, said third equation comprising $y0 = (x0x2) \oplus x3 \oplus (x2x5) \oplus (x5x6) \oplus (x0x7) \oplus (x1x7) \oplus (x2x7) \oplus (x4x8) \oplus (x5x3) \oplus (x7x8) \oplus \text{'}1\text{'}$;

$y1 = x1 \oplus (x0x1) \oplus (x2x3) \oplus (x0x4) \oplus (x1x4) \oplus (x0x5) \oplus (x3x5) \oplus x6 \oplus (x1x7) \oplus (x2x7) \oplus (x5x8) \oplus \text{'}1\text{'}$;

$y2 = x1 \oplus (x0x3) \oplus (x3x4) \oplus (x0x5) \oplus (x2x6) \oplus (x3x6) \oplus (x5x6) \oplus (x4x7) \oplus (x5x7) \oplus (x6x7) \oplus x8 \oplus (x0x8) \oplus \text{'}1\text{'}$;

$y3 = x0 \oplus (x1x2) \oplus (x0x3) \oplus (x2x4) \oplus x5 \oplus (x0x6) \oplus (x1x6) \oplus (x4x7) \oplus (x0x8) \oplus (x1x8) \oplus (x7x8)$;

$y4 = (x0x1) \oplus (x1x3) \oplus x4 \oplus (x0x5) \oplus (x3x6) \oplus (x0x7) \oplus (x6x7) \oplus (x1x8) \oplus (x2x3) \oplus (x3x8)$;

$y5 = x2 \oplus (x1x4) \oplus (x4x5) \oplus (x0x6) \oplus (x1x6) \oplus (x3x7) \oplus (x4x7) \oplus (x6x7) \oplus (x5x3) \oplus (x6x8) \oplus (x7x8) \oplus \text{'}1\text{'}$;

$y6 = x0 \oplus (x2x3) \oplus (x1x5) \oplus (x2x5) \oplus (x4x5) \oplus (x3x6) \oplus (x4x6) \oplus (x5x6) \oplus x7 \oplus (x1x8) \oplus (x3x8) \oplus (x5x8) \oplus (x7x8)$;

$y7 = (x0x1) \oplus (x0x2) \oplus (x1x2) \oplus x3 \oplus (x0x3) \oplus (x2x3) \oplus (x4x5) \oplus (x2x6) \oplus (x3x5) \oplus (x2x7) \oplus (x5x7) \oplus x8 \oplus \text{'}1\text{'}$;

$y8 = (x0x1) \oplus x2 \oplus (x1x2) \oplus (x3x4) \oplus (x1x5) \oplus (x2x5) \oplus (x1x6) \oplus (x4x6) \oplus x7 \oplus (x2x8) \oplus (x3x8)$;

and said fourth equation comprising $y0 = (x1x3) \oplus x4 \oplus (x0x1x4) \oplus x5 \oplus (x2x5) \oplus (x3x4x5) \oplus x6 \oplus (x0x6) \oplus (x1x6) \oplus (x3x6) \oplus (x2x4x6) \oplus (x1x5x6) \oplus (x4x5x6)$;

$y1 = (x0x1) \oplus (x1x4) \oplus (x2x4) \oplus x5 \oplus (x1x2x5) \oplus (x0x3x5) \oplus x6 \oplus (x0x2x3) \oplus (x3x6) \oplus (x4x5x6) \oplus \text{'}1\text{'}$;

$y2 = x0 \oplus (x0x3) \oplus (x2x3) \oplus (x1x2x4) \oplus (x0x3x4) \oplus (x1x5) \oplus (x0x2x5) \oplus (x0x5) \oplus (x0x4x6) \oplus (x2x6) \oplus (x4x6) \oplus \text{'}1\text{'}$;

$y3 = x1 \oplus (x0x1x2) \oplus (x1x4) \oplus (x3x4) \oplus (x0x5) \oplus (x0x1x5) \oplus (x2x3x5) \oplus (x1x4x5) \oplus (x2x6) \oplus (x1x3x6)$;

$y4 = (x0x2) \oplus x3 \oplus (x1x3) \oplus (x1x4) \oplus (x0x1x4) \oplus (x2x3x4) \oplus (x0x5) \oplus (x1x3x5) \oplus (x0x4x5) \oplus (x1x6) \oplus (x3x6) \oplus (x0x3x6) \oplus (x5x6) \oplus \text{'}1\text{'}$;

$y5 = x2 \oplus (x0x2) \oplus (x0x3) \oplus (x1x2x3) \oplus (x0x1x4) \oplus (x0x5) \oplus (x2x5) \oplus (x4x5) \oplus (x1x6) \oplus (x1x2x6) \oplus (x0x3x6) \oplus (x3x4x6) \oplus (x2x5x6) \oplus \text{'}1\text{'}$;

$y6 = (x1x2) \oplus (x1x1x3) \oplus (x0x4) \oplus (x1x5) \oplus (x3x5) \oplus x6 \oplus (x0x1x6) \oplus (x2x3x6) \oplus (x1x4x5) \oplus (x0x5x6)$;

* * * * *

UNITED STATES PATENT AND TRADEMARK OFFICE
CERTIFICATE OF CORRECTION

PATENT NO. : 7,583,800 B2  
APPLICATION NO. : 10/679391  
DATED : September 1, 2009  
INVENTOR(S) : Jong-Su Lim Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Fourteenth Day of September, 2010

David J. Kappos
*Director of the United States Patent and Trademark Office*